Figure 1:
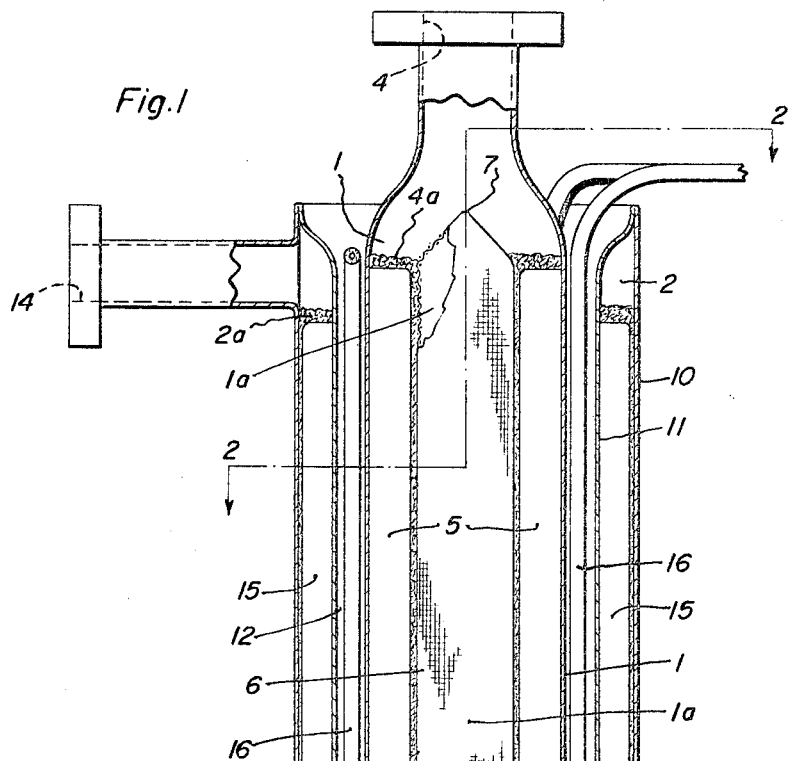

Aug. 9, 1966 P. L. READ 3,264,803
SORPTION VACUUM PUMP
Filed Jan 21, 1963 2 Sheets-Sheet 1

Inventor:
Philip L. Read,
by John P. Dellitt
His Attorney.

Inventor:
Philip L. Read,
by John P. Dellett
His Attorney.

United States Patent Office 3,264,803
Patented August 9, 1966

3,264,803
SORPTION VACUUM PUMP
Philip L. Read, Schenectady, N.Y., assignor to General Electric Company, a corporation of New York
Filed Jan. 21, 1963, Ser. No. 252,627
2 Claims. (Cl. 55—208)

This invention relates to sorption pumps and particularly to sorption pumps useful in the operation of very high vacuum systems.

A sorption pump is a vacuum pump wherein gases are sorbed on the surface, and especially in the pores, of porous materials such as zeolites, alumina, and the like. In the conventional sorption pump the sorbent material is placed in a conduit or container connected in a vacuum system in a manner such that gas molecules flow over or past the sorbent material coming in contact with the sorbent, the input and output connections to the pump commonly being adjacent or contiguous and frequently constituting a single connection.

During the time the sorption pump is operating the sorbent is usually maintained at some low temperature at which its sorbing ability is high, so the sorbent retains sorbed gas molecules for long periods of time. Gas molecules in the system coming in contact with the sorbent material and adhering to the surface eventually become lodged in the tiny pores of the sorbent material. Gas molecules are removed from the system in this manner, for a time which depends on the temperature of the sorbent, and the system pressure decreases as a result.

Prior to its use, the sorbent is frequently prepared by heating to some temperature higher than the operating or pumping temperature of the sorption pump. During such preparation of the sorbent, the sorption pump output is opened to the atmosphere, or desirably to a chamber which is pumped to some pressure lower than atmospheric. Conventional pumps are particularly susceptible to contaminants entering the system during sorbent preparation because of their adjacent input and output connections. After the sorbent is prepared by heat, the sorption pump is then placed in operation by closing the connection to the atmosphere or lower pressure chamber, and then cooling the sorbent to a low operating temperature.

The ultimate pressure which may then be attained in the conventional sorption pump is limited by the ability of the sorbent used in the sorption pump to sorb appreciable amounts of various common gases present in the system and by the contamination of the system by vapor entering the system from the atmosphere or lower pressure system during the preparation of the sorbent. In order to extend the sorption pumping range, it would be desirable to lower partial pressure of poorly sorbed gases while also preventing contamination of the system.

The heat usually employed for preparing a sorption pump for operation, and the cooling which is effective for enhancing sorption during operation, are conventionally provided using an external oven and an external coolant container. Not only is the required physical movement of the pump or heat exchange equipment inconvenient and clumsy, but the efficiency of heating and cooling is usually less than desirable.

It is therefore an object of the present invention to provide an improved and economical sorption pump useful in attaining high vacua at relatively high pumping speeds.

It is another object of the present invention to provide an improved sorption pump having a self-contained coolant vessel and heating means in good thermal contact with the sorbent material.

Briefly in accordance with a principal embodiment of the present invention, a sorption pump includes isolated inlet and outlet chambers comprising two separate regions or sections. The input and output chambers are isolated by a separating means, the output section including an area where gas flows through an extensive region or barrier of sorbent material wherein the gas is in substantially complete contact with the sorbent material. The back flow of gases into the pump is substantially eliminated and this arrangement insures cleanliness of the high vacuum system and the sorbent material itself.

According to a feature of the invention the means separating the chambers comprises a moat or self-contained vessel including a permanently or semi-permanently enclosed heating unit and/or coolant container for desirably altering the temperature of the pump.

In accordance with another feature of the present invention, close thermal contact is provided between the sorbent material and the moat or vessel in which is placed the heating or cooling means.

Figure 2:
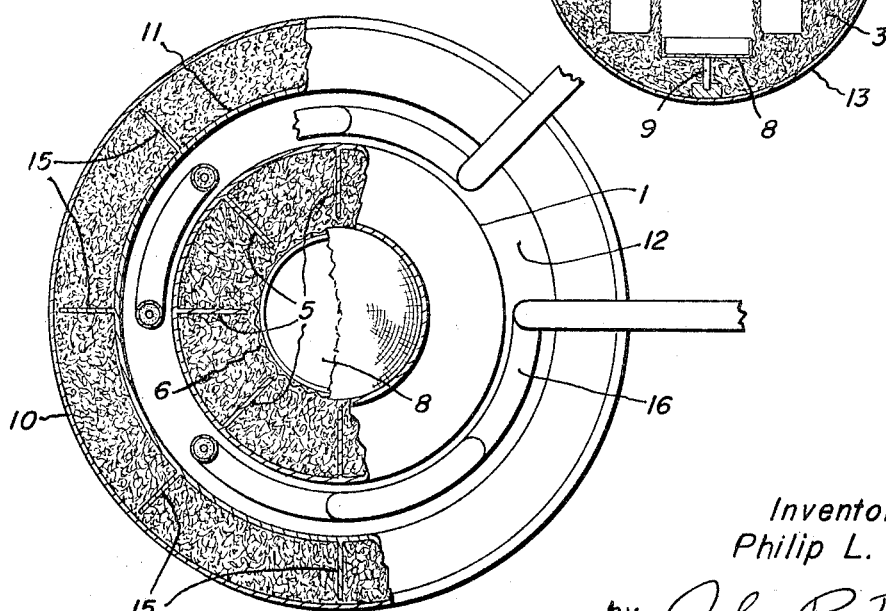
Figure 3:
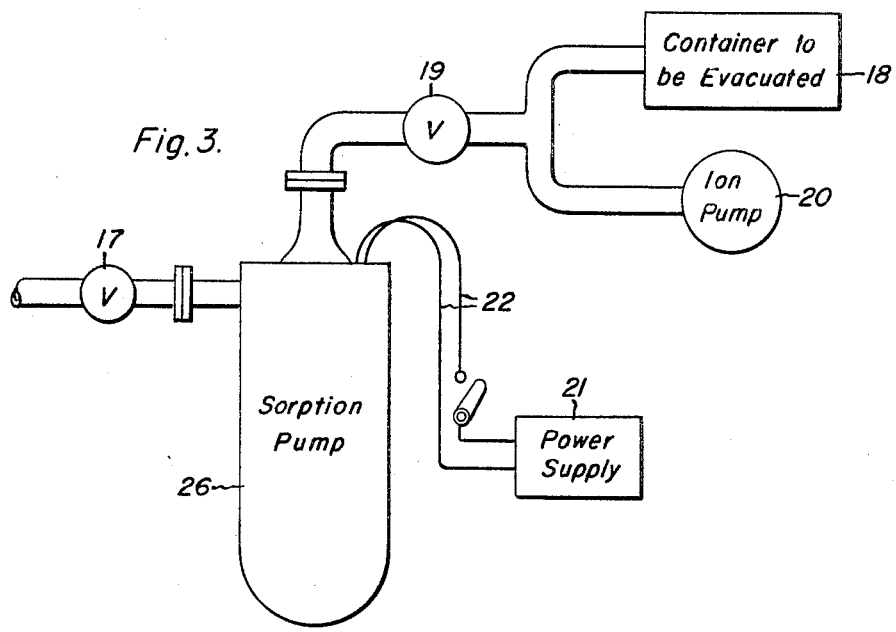
Figure 4:
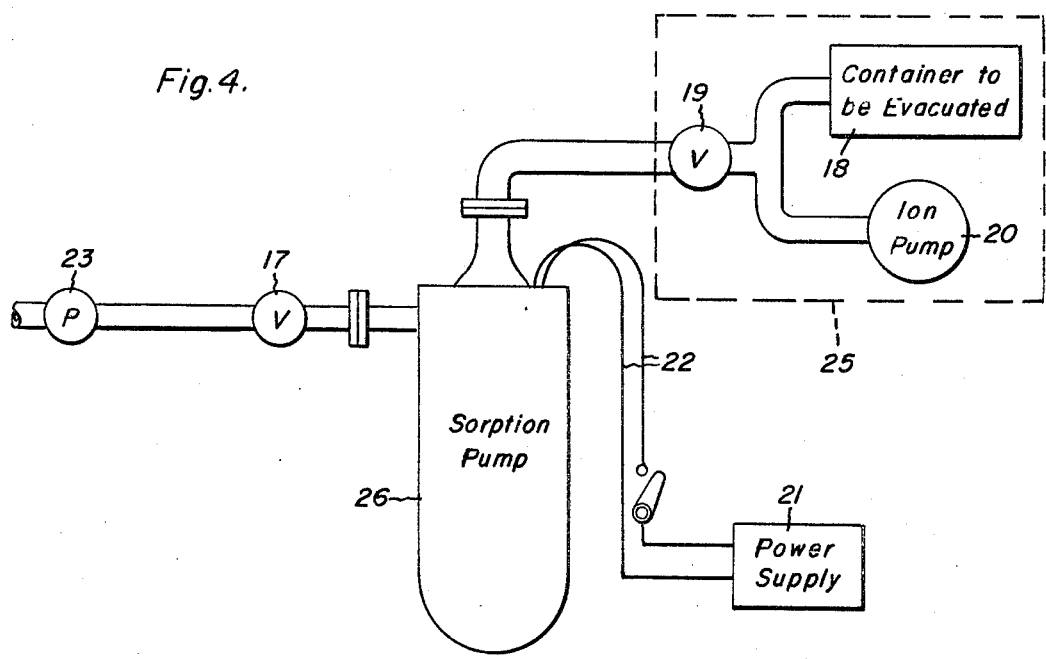

The subject matter which I regard as my invention is particularly pointed out and distinctly claimed in the concluding portion of this specification. The invention, however, both as to organization and method of operation, together with further objects and advantages thereof, may best be understood by reference to the following description taken in connection with the accompanying drawings wherein like reference characters refer to like elements and in which:

FIG. 1 is a vertical cross-section of a sorption pump in accordance with the present invention, FIG. 2 is a cross-section taken at 2—2 in FIG. 1, FIG. 3 is a schematic diagram of a first illustrative vacuum system employing the present invention, and FIG. 4 is a schematic diagram of a second illustrative vacuum system employing the present invention.

Referring to FIG. 1, a sorption pump according to the present invention includes concentric cylindrical sorbent material containers or chambers 1 and 2 joined at a region 3 at their lower extremity. These cylindrical containers may be formed of stainless steel. Central container or pumping chamber 1 is provided with an upper port 4 for connection to an evacuated system. The inside of cylindrical container 1 is filled, except for a lengthy central area 1a, with a porous sorbent material 4a, for example, an alkali metal alumino silicate or zeolite such as 13X molecular sieve. In this designation the numeral 13 refers to the diameter of the pores in the sorbent material, being 13 Angstrom units in diameter. The cylindrical walls of container 1 are provided with a number of inwardly extending vanes 5 which are more clearly illustrated in the FIG. 2 cross-section. These vanes establish a good thermal contact between container wall and the sorbent material.

The central portion 1a of pumping chamber 1 is occupied by a closed cylindrical screen or cage 6 which is conveniently provided with an apex 7 extending above the level of the sorbent material. Sorbent material is excluded from the area inside this structure. The cage extends nearly to the lower extremity of the sorption pump where it is supported by metal cup member 8 resting on a support stem or spindle 9 attached to the bottom of the sorption pump. The cage provides a large area of contact between gas from port 4 and the sorbent material 4a around the periphery of the cage.

Outside central container 1 there is disposed a second folded back container or chamber 2 having an outer concentric cylindrical wall 10 and having an inner cylindrical wall 11, larger in diameter than container 1 but spaced therefrom leaving an intermediate separating means comprising a moat or vessel 12 closed at its lower extremity. The inner wall 11 is flared or spun inwardly at the lower end of container 1 where it is joined thereto, as by welding, to complete the vessel 12. The upper portion of inner wall 11 is flared or spun outwardly and similarly joined to outer wall 10. The outer container 2 is closed off or filled with sorbent material 2a up to the level of the outlet port 14 so that any gas flow in container or chamber 2 must pass through the sorbent material. An outlet port 14, which may lead to the atmosphere or a rough vacuum, is provided into the upper extremity of chamber 2. Vanes 15, secured to inner wall 11, extend into the sorbent material of container 2, providing good thermal contact between wall 11 and the sorbent material, and may be more clearly discerned in the FIG. 2 cross-section.

The outer container is closed off at its lower extremity with a steel hemispherical section 13 forming the bottom of the sorption pump and a support for spindle 9. This hemisphere extends below the lower end of container 1. The gas communicating area formed thereby, which provides communication between the two containers, is also filled with sorbent material.

In the separating moat or vessel 12 there is located a heating element 16 which may be of the Calrod type, capable of being heated to high temperatures. This heating unit, for example, comprises a steel sheath enclosing an electrical heating coil or helix supported inside and spaced from the sheath by a refractory insulating material. The length of the heating element may be increased by bending it into a circuitous path inside moat 12, in close thermal relation to wall 11 and the external wall of container 1, whereby heat may be conducted into the sorbent material via the walls and via the vanes 5 and 15 extending into the sorbent material. The same moat or vessel 12 may be used for cooling during the pump's operation. The vessel or moat is in that case conveniently filled with a coolant liquid and the vessel then also provides the same close thermal contact with the sorbent material. Since the vessel walls are substantially evacuated, an excellently insulated coolant container is thus provided by the sorption pump.

In employing the sorption pump according to the present invention, both the inlet and outlet ports 4 and 14 are closed off by valves leading to a high vacuum region and a lower vacuum region, respectively. From the foregoing description it is apparent these inlet and outlet ports are completely isolated from one another and do not constitute a common conduit. Rather the outer container is closed off with sorbent material through which any back-flow of gas must pass before reaching central pumping chamber 1. It has been found such a back-flow reaches sorbent material only in the upper portion of container 2 near outlet port 14 and in effect never reaches chamber 1. Thus, the cleanliness of the inner or pumping region can be maintained at a high level. The inner chamber accomplishes most of the actual sorbent or pumping action in this clean environment.

The sorption which occurs in sorbent material, for example, zeolites and the like, is mainly persorption, i.e. adsorption in pores of atomic dimension established during dehydration of the zeolite crystals. The effective surface area of these pores is about 100 times the external surface area of the zeolite crystals.

During the preparation of the pump the sorbent is usually heated or "baked" to remove hydrated water and other adsorbed entities from the pores of the zeolite crystal to enhance the sorptive capabilities of the material, this heating being accomplished by heating element 16 in moat 12. The heat is conducted to the sorbent material in both chambers 1 and 2 via vanes 5 and 15. The gases expand and are forced to leave the sorption pump through port 14. Residual gases and back contaminants are trapped in or expelled from chamber 2 and in general do not return to chamber 1.

Now the pump is ready for the pumping of gases from a vacuum system. Port 14 is closed by valve means (not shown) and port 4 is opened to the vacuum system, whereupon gases in the vacuum system pass in through port 4 to be sorbed by the sorbent material in the central area of the pump. The gases pass down through the central portion of container 1 in cage 6 and come in contact with a large surrounding area of sorbent material. Also at this time, coolant is preferably added to the moat or vessel 12 to enhance the sorptive properties of the material. Such coolant may comprise liquid nitrogen, liquid helium, Dry Ice, ice cubes or the like. The cooling increases the sticking property of gases to the sorbent material, especially for gases that are difficult to sorb. Of course, in general, the lower the temperature the better the sorptive qualities of the material. It is again noted that vanes 5 in container 1 and vanes 15 in container 2 provide quick temperature alteration of the sorbent material, achieving good thermal contact therewith from moat or vessel 12.

When pumping on a high vacuum system, using, for example, liquid nitrogen as a coolant in moat 12, it has been found possible to reach a point where maximum sorption capability is exceeded. It thus appears when the sorbent material is made extremely cold, the gas molecules remain sorbed for long times on the surface of the sorbent, but migration of gas molecules along the surface of the sorbent material is very slow. Some of the gas molecules may not then become entrapped in the pores of the sorbent material. If, however, after the extreme cooling of the sorbent material, the sorbent material is allowed to warm up slightly, a point can be reached where the gas molecules are sufficiently mobile on the surface of the sorbent material so they may reach and become lodged in the material pores. It is therefore sometimes desirable to allow the sorption pump to warm up slightly as by allowing the coolant to evaporate. Then more coolant is added to recycle the sorbent material to the lower temperature.

Although cooling with liquid nitrogen or the like is advantageous, it should be realized that merely cooling the sorption pump to room temperature or slightly below, with the use of more readily available coolant material, also provides a desirable mode of operation, but usually a lesser degree of vacuum. Any appropriate downward alteration of temperature can be employed for aiding pumping action.

The sorbent material in central container 1 is maintained especially clean inasmuch as back contaminants have been sorbed in outer chamber 2, and are not re-evolved to the evacuated system because of the extensive area of sorbent material in chamber 2. The maximum pumping of gases from the evacuated system in the central chamber is thus possible. Chamber 2 thus acts as a trapping region, which is heated and cooled through the medium of vessel 12 in conjunction with the rest of the sorption pump. With the sorption pump of the present invention, it is found possible to attain pressures in the ultra-high vacuum range. That is the present sorption pump filled, for example, with liquid nitrogen-chilled 13X molecular sieve (a synthetic zeolite), can be used to pump a small system down to pressures well below $1 \times 10^{-9}$ Torr.

Sorption pumps are frequently used in conjunction with other vacuum equipment; for example, an ion pump may be connected to the high vacuum system in common with port 4 of the sorption pump, and a roughing pump of the mechanical type or of the diffusion type may be connected between outlet port 14 and the atmosphere. The roughing pump then produces a lower order vacuum providing a starting point for operation of the sorption pump. Such roughing pumps are imperfect and are subject to contaminant back-flow. For example, an oil diffusion pump may allow the back-flow of oil vapor into the sorption pump via outlet 14. However, such contaminant must pass through the considerable body of sorbent material in container 2 before reaching the pumping chamber 1. In practice these contaminants are sorbed before travelling very far from port 14. The sorption pump of the present invention in this manner again promotes the establishment of a clean high vacuum using the combination of a roughing pump and sorption pump.

When the sorption pump is used in conjunction with a vacuum pump of the getter-ion type, simply called an ion pump, attached to the highly evacuated system, extension of the pumping range employing the sorption pump can be especially important, since the ultimate vacuum attainable by the ion pump is limited by the cleanliness of the system at the time ion pump operation is initiated. The initial cleanliness of an ion pump can be maintained at a very high level if it does not have to pump at pressures greater than, say, $10^{-8}$ or $10^{-9}$ Torr. Then, with the use of the ion pump, pressures as low as $10^{-10}$ to $10^{-12}$ Torr. are possible. In addition, the extension of the pumping range of the sorption pump allows the power supply for the ion pump to be considerably reduced in size and cost because of decreased starting current requirements.

Utilization of the sorption pump in the present invention in a typical vacuum system is illustrated in FIG. 3. In this system a synthetic zeolite-filled sorption pump 26 is valved to the atmosphere by means of outlet valve 17, and is connected to a container 18 to be evacuated through a valve 19 interposed between the sorption pump's inlet and the container to be evacuated. An ion pump 20 is also connected to the container 18. A power supply 21, e.g. the A.C. line, is connected to the built-in heating element by means of leads 22.

An exemplary use of the sorption pump in the system of FIG. 3 may follow the following procedure:

(1) With valves 17 and 19 open, the heating element of the sorption pump is energized to heat the zeolite sorbent therein to approximately 500° C.

(2) Valve 17, which leads to the atmosphere, is then closed.

(3) With valve 19 open, the sorption pump is cooled, preferably with liquid nitrogen, to a low temperature. This may produce a vacuum in the container 18 on the order of $1 \times 10^{-4}$ Torr., the gas in container 18 having been sorbed in the sorption pump.

(4) Valve 19 is closed. At this point the ion pump may be started to reduce the vacuum of the system further; however, it is frequently desirable to reduce pressure of the system further using the sorption pump to give the ion pump easier and cleaner starting conditions.

(5) The heating element is again energized to bring the zeolite sorbent back up to 500° C. Valve 17 is opened when the pressure in the sorption pump nears atmospheric pressure.

(6) Valve 17 is closed.

(7) The sorption pump is again cooled by the addition of liquid nitrogen to the moat.

(8) Valve 19 is opened. At this point the container 18 will have reached a pressure in the $10^{-5}$ Torr. range.

(9) The above cycle may be again repeated or the ion pump may be energized at this point to reach a pressure for container 18 from $10^{-9}$ to $10^{-10}$ Torr.

In FIG. 4 there is illustrated another example of a vacuum system employing a sorption pump according to the present invention. In this arrangement a yet higher vacuum may be reached. The vacuum system illustrated is the same as that illustrated in FIG. 3, as regards like elements indicated by like reference numerals but with the addition of the roughing pump, which may be of the oil diffusion type, 23. The roughing pump is effective to remove gases not easily sorbed.

An oven enclosure indicated by dashed line 25 surrounds container to be evacuated 18, valve 19 and ion pump 20. This oven enclosure is employed in order to remove occluded gases from the interior walls of the various elements.

The FIG. 4 system may be operated according to the following procedure:

(1) With valves 17 and 19 open, and with oven 25 in place, and with the internal sorption pump heater energized, the system including ion pump, container 18 and valve 19 with interconnections, is heated to approximately 400° C. The internal sorption pump heater may bring the sorbent material to higher temperatures, e.g. 500° C. The roughing pump is effective to remove hard to sorb gas such as helium and neon. Back-flow of gases, for example, oil from pump 23, is restrained by the heated outer chamber of pump 26.

(2) With valves 17 and 19 still open, the system is allowed to cool to room temperature except for sorption pump 26 whose internal heater may remain energized. The reduction of the out-gassing rate in the system components may bring the pressure in the system to $10^{-7}$ Torr.

(3) Now valve 17 is closed and the sorption pump's internal heater is de-energized. The system internal pressure may now reach a pressure of $10^{-8}$ to $10^{-9}$ Torr.

(4) The sorption pump is cooled with liquid nitrogen whereupon the pressure falls to the $10^{-11}$ Torr. range.

(5) Valve 19 is closed and operation of the ion pump initiated. The ion pump may be of the type illustrated in Westendorp et al. Patent 2,755,014 or Gurewitsch et al. Patent 2,925,214. Operation of the ion pump can now achieve a vacuum in the $10^{-12}$ Torr. range or better.

Rather than close valve 19 and operate the ion pump in step 5 above the sorption pump may be allowed to rise in temperature somewhat, as by evaporation of the coolant and re-cooling as hereinbefore described, in order to lodge an increased number of gas molecules in the pores of the sorbent material. Then the valve 19 may be closed and operation of the ion pump initiated.

Synthetic zeolite is given as a principal example of a sorbent material used in conjunction with the present invention. Other materials may, however, be advantageously employed, as for reaching higher vacua. Activated alumina, for example, may be baked to a higher temperature, e.g. 1000° C., providing a somewhat cleaner sorbent material. Zeolite is limited to a baking temperature of approximately 500° C.

It is also appreciated the sorption pump need not be used in conjunction with a roughing pump and/or an ion pump employed in the operating examples described above. The sorption pump can be employed by itself as a very economical means of achieving a vacuum, or it may be employed in conjunction with any combination of other pumping apparatus.

While heating and cooling provided in the moat is efficient to produce rapid raising and lowering of the temperature of the sorbent material and rapid pumping, it is realized that external heating and cooling elements can be utilized in addition to the self-contained vessel. For example, an additional heating element may be wrapped around the sorption pump. Likewise the pump is conveniently constructed of such size as to be submersible in a conventional low temperature Dewar. Furthermore, refrigeration coils may be placed around the pump or in the internal vessel or moat.

From the foregoing it is apparent the present invention provides an economical self-contained sorption pump accomplishing clean pumping action and cooperating to produce very high vacua. The clean pumping action is accomplished through the isolation of pump input and output and the provision of an isolated output section or chamber including an area where gas must flow in a path through, and almost entirely in contact with, sorbent material. The separation or isolation between input and output is attained through the use of an intermediate separation means comprising a moat or vessel containing an internal heating element and constituting a vessel for coolant material. Ultra-high vacua are easily attainable with this pump in combination with conventional pumping means. Moreover, the pump is very economical and useable by itself as well as in conjunction with other devices for conveniently providing vacuum conditions with a maximum of convenience and economy, with the absence of moving parts.

While I have shown and described several embodiments of my invention, it will be apparent to those skilled in the art that many changes and modifications may be made without departing from my invention in its broader aspects; and I therefore intend the appended claims to cover all such changes and modifications as fall within the true spirit and scope of my invention.

What I claim as new and desire to secure by Letters Patent of the United States is:

1. A sorption pumping device comprising a pair of substantially concentric, vertically coextensive, annular containers, said containers being spaced apart, the inner wall of the inner container comprising a gas pervious member, the outer wall of the inner container and the inner wall of the outer container being joined together at their lower ends to form a coolant receiving region between said containers, an electric heating element positioned within said coolant region, a gas passageway connecting the lower ends of said containers, sorbent material positioned between the walls of each of said containers and in said passageway, gas inlet means connected to the upper end of said inner container, gas outlet means connected to the upper end of said outer container, whereby gas flowing between said inlet and outlet means passes through said pervious member and the sorbent material in said two containers and said passageway in series, and valve means connected to said outlet means.

2. The device of claim 1 in which thermally conductive vanes extend inwardly into each of said containers from the walls forming said cooling region to contact the sorbent material therein and facilitate the cleaning of the sorbent material when said heating element is energized.

References Cited by the Examiner

UNITED STATES PATENTS

| | | | |
|---|---|---|---|
| 2,450,289 | 9/1948 | Marek | 55—208 |
| 2,831,549 | 4/1958 | Alpert. | |
| 2,949,015 | 8/1960 | Fite. | |
| 3,172,748 | 3/1965 | Feinleib et al. | 55—389 |
| 3,197,945 | 8/1965 | Zaphiropoulos | 55—389 |
| 3,200,569 | 8/1965 | Wheeler | 55—389 |

OTHER REFERENCES

Bannock, R. R.: Molecular Sieve Pumping In Vacuum, vol. 12, No. 2, pp. 101–106, Pergamon Press Ltd., March-April 1962.

REUBEN FRIEDMAN, *Primary Examiner.*

C. N. HART, B. NOZICK, *Assistant Examiners.*